United States Patent
Beecher

(12) 
(10) Patent No.: US 7,460,497 B2
(45) Date of Patent: Dec. 2, 2008

(54) TWO WAY SERIAL COMMUNICATION

(75) Inventor: Phillip Edward Beecher, Sussex (GB)

(73) Assignee: Silicon Laboratories Inc., Austin, TX (US)

( * ) Notice: Subject to any disclaimer, the term of this patent is extended or adjusted under 35 U.S.C. 154(b) by 785 days.

(21) Appl. No.: 10/980,564

(22) Filed: Nov. 3, 2004

(65) Prior Publication Data

US 2005/0281283 A1    Dec. 22, 2005

Related U.S. Application Data

(63) Continuation-in-part of application No. 10/879,430, filed on Jun. 29, 2004, now abandoned.

(30) Foreign Application Priority Data

Nov. 3, 2003    (GB) .................................. 0325593.2

(51) Int. Cl.
*H04L 12/403* (2006.01)

(52) U.S. Cl. ...................................... 370/282; 370/522
(58) Field of Classification Search ................. 370/282, 370/294, 522
See application file for complete search history.

(56) References Cited

U.S. PATENT DOCUMENTS

| | | | |
|---|---|---|---|
| 7,246,188 B2 * | 7/2007 | Ganasan et al. ............. | 710/241 |
| 2004/0039866 A1 * | 2/2004 | Cheung ...................... | 710/305 |
| 2005/0076169 A1 * | 4/2005 | Modelski et al. ............ | 710/100 |
| 2005/0239503 A1 * | 10/2005 | Dressen et al. .............. | 455/557 |
| 2006/0212679 A1 * | 9/2006 | Alfano et al. ................. | 712/38 |

* cited by examiner

*Primary Examiner*—Melvin Marcelo
(74) *Attorney, Agent, or Firm*—Francissen Patent Law, P.C.

(57) ABSTRACT

The invention relates to a system of two-way packet-oriented serial communication between master and slave. Messages 20, 30 include status and request words 22, 32 which indicate the status of master and slave. Each of the master and slave determines from these words 22,32 separately whether communication is to continue from master to slave, from slave to master, both, or neither.

16 Claims, 3 Drawing Sheets

TWO WAY SERIAL COMMUNICATION

RELATED APPLICATION

This application is a continuation-in-part of U.S. patent application Ser. No. 10/879,430, filed Jun. 29, 2004 now abandoned.

The invention relates to apparatus, methods and computer program products for controlling message flow in two-way serial communications.

A variety of protocols exist for transmitting data synchronously through serial links between pairs of devices, including in particular between a master device controlling the communication and a slave device. Such data transmission can occur using full duplex transmission where data can be exchanged in both directions simultaneously, or half duplex transmission wherein data can be exchanged in both directions but using the physical link in only one direction at a time.

One such protocol is the serial packet interface (SPI). A variety of SPI devices exist for implementing duplex serial communications between master and slave. The devices implement a variety of proprietary protocols.

A problem with existing devices, both using SPI and otherwise, is that the slave device can suffer from overrun or underrun when the master device is ready to transmit data to the slave and receive data from the slave at the same time.

One SPI slave device does offer some control over data flow, namely the Maxim MAX3110E which is an RS232 transceiver that uses an SPI interface to interface with a microprocessor. The device does not support bidirectional data transfer. This device provides a mechanism for aborting data transfer if the device is not ready. 2 bits of status information are sent as the first two bits of each word transferred on the SPI. However, these additional bits represent a significant data overhead. Many master devices only support byte oriented data transmission, and the overhead is particularly severe in such cases.

Serial communication is a particular problem between discrete integrated circuits of a multi-chip solution.

According to the invention there is provided a communication method in a two-way synchronous packet serial communications link between a master device and slave device, the method including: sending a first message packet from master to slave, the first message packet including at its start a request block including a master receive data enable field indicating whether the master layer is ready to receive data and a master transmit data request field indicating whether the master layer ready to send data; sending a second message packet from the slave to the master, the second message packet including at its start a status block including a slave receive data enable field indicating whether the slave layer is ready to receive data and a slave transmit data request field indicating whether the slave layer ready to send data; transmitting the rest of the first message packet if the master transmit data request field indicates that the master layer is ready to send data and the slave receive data field indicates that the slave layer is ready to receive data; and transmitting the rest of the second message packet if the slave transmit data request field indicates that the slave layer is ready to send data and the master receive data field indicates that the master is ready to receive data.

By starting the first and second message packets exchanged between master and slave with the status and request words both the master and slave can independently control data flow. This avoids the problem in current approaches that the slave can overrun when the master device ready to transmit and receive data at the same time. If the receive data enable field indicates that either the master or slave device do not wish to receive data, any subsequent data received by that device will be ignored.

There are two significant improvements over the approach used in the MAX3110E. Firstly, the status is exchanged only at the start of each message packet. This reduces bit overhead. Secondly, the MAX3110E only transmits in one direction at a time and can only abort data transfer if the slave device is not ready. In contrast, the present invention allows data transfer to continue in each direction independently, so if one device is ready to transmit and the other device to receive, so that data flow can proceed in one direction, but the converse is not true, data flow can continue. For example if the slave device is not ready to receive but the master device is, data transfer can continue from slave to master but data transfer from master to slave is aborted.

The simple implementation and low overhead make the approach ideal for low cost high speed solutions.

Preferably, the method further includes aborting transmission if the status and request words indicate that neither the first message packet nor the second message packet are to be continued. This increases efficiency.

In a particularly preferred embodiment, the first two bits to be transmitted in the status block are a pair of single bits being the master receive data enable field and the master transmit data request field. Similarly, the first two bits in the request block may preferably be a pair of single bits being the slave receive data enable field and the slave transmit data request field. In this way, transfer may be aborted as soon as possible if the status and request bits determine that no further message packet transfer is required. Testing may commence even before the full block has been received.

In embodiments, each message packet is divided into words of a predetermined length, the request or status block forming the first word. The words may be bytes, 16-bit words, 32-bit words, or any alternative length of word.

Preferably, the first and second message packets include a length word after the request or status block, the length word indicating the length of the message packet in words. This enables both master and slave to correctly process the messages.

Preferably the method includes transmitting data between master and slave on a serial packet interface (SPI) link. Further preferably, the link uses just four communication lines, namely chip select, clock, data in and data out. In such preferred embodiments, no interrupt request line is used.

In embodiments, both the first and second message packets include a primitive defining the payload format. This may be in particular a medium access control (MAC) layer primitive defining the MAC.

As well as the complete system, in another aspect the invention relates to a method of operating a master device in a two-way synchronous serial communications link between a master device and a slave device, the method including: sending a first message packet to the slave, the first message packet including at its start a request block including a master receive data enable field indicating whether the master layer is ready to receive data and a master transmit data request field indicating whether the master layer ready to send data; receiving a second message packet from the slave, the second message packet including at its start a status block including a slave receive data enable field indicating whether the slave layer is ready to receive data and a slave transmit data request field indicating whether the slave layer ready to send data; transmitting the rest of the first message packet if the master transmit data request field indicates that the master layer is ready to send data and the slave receive data field indicates that the slave layer is ready to receive data; and receiving the rest of the second message packet if the slave transmit data request field indicates that the slave layer is ready to send data and the master receive data field indicates that the master is ready to receive data.

In a further aspect, the invention relates to a method of operating a slave device in a two-way synchronous serial communications link between a master layer in the slave device and a slave layer in the slave device, the method including: receiving a first message packet from the master, the first message packet including at its start a request block including a master receive data enable field indicating whether the master layer is ready to receive data and a master transmit data request field indicating whether the master layer ready to send data; transmitting a second message packet to the master, the second message packet including at its start a status block including a slave receive data enable field indicating whether the slave layer is ready to receive data and a slave transmit data request field indicating whether the slave layer ready to send data; receiving the rest of the first message packet if the master transmit data request field indicates that the master layer is ready to send data and the slave receive data field indicates that the slave layer is ready to receive data; and transmitting the rest of the second message packet if the slave transmit data request field indicates that the slave layer is ready to send data and the master receive data field indicates that the master is ready to receive data.

The invention also relates to a computer program product arranged to cause a serial device to carry out a method as set out above.

In another aspect, the invention relates to a master device, comprising: a duplex or half duplex synchronous serial interface for communicating with a slave device using a two-way packet-oriented synchronous serial communications link; and a controller arranged to cause the master device: to send a first message packet to the slave device through the serial interface, the first message packet including at its start a request word including a master receive data enable field indicating whether the master layer is ready to receive data and a master transmit data request field indicating whether the master layer ready to send data; to receive a second message packet from the slave device through the serial interface, the second message packet including at its start a status word including a slave receive data enable field indicating whether the slave layer is ready to receive data and a slave transmit data request field indicating whether the slave layer ready to send data; to transmit the rest of the first message packet through the serial interface if the master transmit data request field indicates that the master layer is ready to send data and the slave receive data field indicates that the slave layer is ready to receive data; and to transmit the rest of the second message packet if the slave transmit data request field indicates that the slave layer is ready to send data and the master receive data field indicates that the master is ready to receive data.

In a yet further aspect, the invention relates to a slave device, comprising: a duplex or half-duplex synchronous serial interface for communicating with a master device using a two-way packet-oriented synchronous serial communications link; wherein the slave device is arranged to receive a first message packet from the master device through the serial interface, the first message packet including at its start a request word including a master receive data enable field indicating whether the master is ready to receive data and a master transmit data request field indicating whether the master is ready to send data; to synchronously send a second message packet to the master device through the serial interface, the second message packet including at its start a status word including a slave receive data enable field indicating whether the slave layer is ready to receive data and a slave transmit data request field indicating whether the slave layer is ready to send data; to continue to receive the first message packet through the serial interface if the master transmit data request field indicates that the master is ready to send data and the slave receive data field indicates that the slave layer is ready to receive data; and to continue to transmit the second message packet if the slave transmit data request field indicates that the slave layer is ready to send data and the master receive data field indicates that the master is ready to receive data.

As well as individual master and slave devices as set out above the invention also relates to a synchronous communications system including such a master device and at least one such slave device. The master and slave devices may in particular be discrete integrated circuits.

In particular, in an aspect the invention relates to a synchronous communications system, comprising: a master device having a serial interface; a slave device having a serial interface; a synchronous serial communications link between the serial interfaces in the master and slave devices; wherein the synchronous communications system is arranged: to send a first message packet from master to slave, the first message packet including at its start a request word including a master receive data enable field indicating whether the master layer is ready to receive data and a master transmit data request field indicating whether the master layer ready to send data; to send a second message packet from the slave to the master, the second message packet including at its start a status word including a slave receive data enable field indicating whether the slave layer is ready to receive data and a slave transmit data request field indicating whether the slave layer ready to send data; to continue to transmit the first message packet if the master transmit data request field indicates that the master layer is ready to send data and the slave receive data field indicates that the slave layer is ready to receive data; and to continue to transmit the second message packet if the slave transmit data request field indicates that the slave layer is ready to send data and the master receive data field indicates that the master is ready to receive data.

The serial communications link may in particular have four data lines, functioning as a clock line, a chip select line, a data out line for transmitting data to the master and a data in line for transmitting data to the slave.

For a better understanding of the invention, the same will now be described, purely by way of example, with reference to the accompanying drawings, in which.

Figure 1:
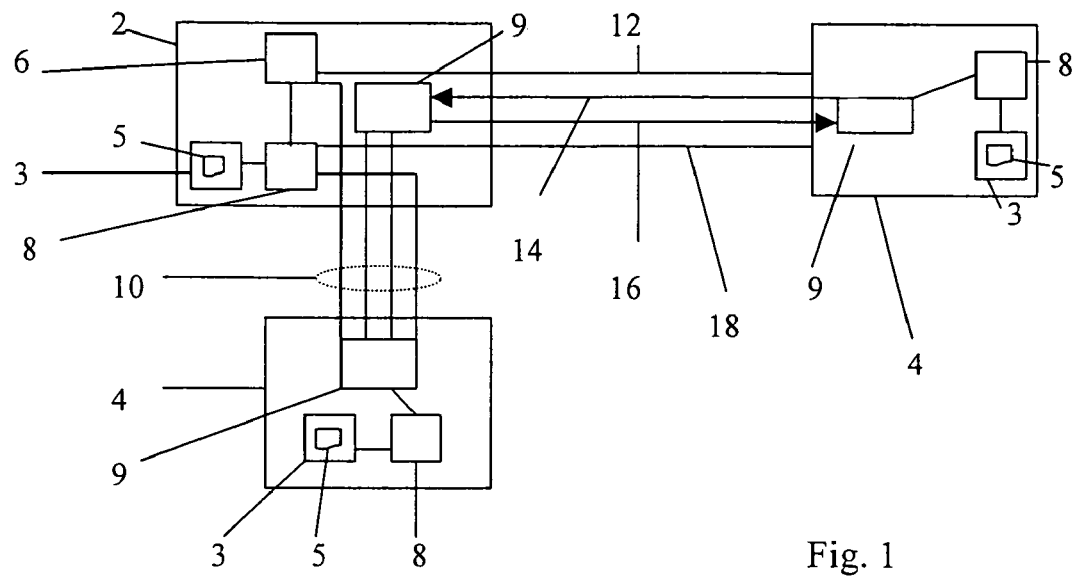
FIG. 1 shows a schematic drawing of a master—slave system according to the invention.

The system includes a master device 2 and one or more slave devices 4. An electrical connection 10 according to the SPI protocol links the master and slave devices—the connection includes a clock line 12, a data input line 14 for inputting data to the master, a data output line 16 for outputting data to the master, and a chip select line 18 for selecting a slave device.

The master device 2 includes a clock 6 connected to the clock line 12. Both master and slave devices 2,4 include a controller 8, transceiver 9 to handle the incoming and outgoing messages, and memory 3, including look-up table 5. The master 2 controller 8 is used to select one of the slave devices 4 for communication at any one time.

In use, the master device 2 selects one of the slave devices 4 for communication by sending a signal on the chip select line 18 corresponding to that device to poll. If required, each slave can be polled in turn.

Figure 2:
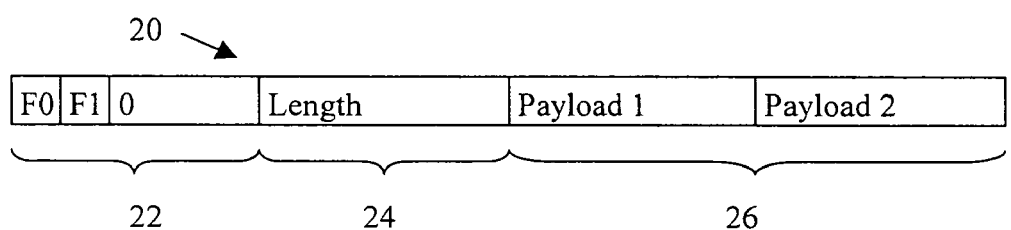
FIG. 2 shows a schematic drawing of the messages sent.
Figure 2:
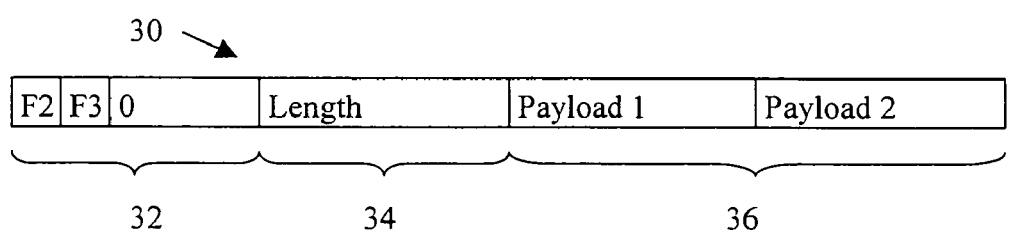

On this polling signal the master starts transmitting the request message packet 20 to the slave and the slave device starts transmitting the status message packet 30 to the master. The speed of data transfer is under the control of the clock 6. The status and request message packets 20,30 are presented schematically in FIG. 2. In this example the words transmitted are of eight bits, i.e. the words are bytes.

The first byte of the request message packet 20 is a request byte in which the first bit to be transmitted is a single bit flag F0 which is set when the master device is ready to receive data from the slave device. If this bit is clear, then any data sent by the slave will be ignored. The second bit of the request byte is flag F1 which is set when the master device has data to send to the slave.

The remaining bits of the status byte are ignored.

Similarly, the first byte of the status message packet 30 is a status byte in which the first bit to be transmitted is a single bit flag F2 which is set when the slave device is ready to receive data from the master device. If this bit is clear, then any data sent by the master will be ignored. The second bit of the status byte is flag F3 which is set when the slave device has data to send to the master.

Immediately on receipt of the flags F0, F1, F2, F3 the master and slave devices independently determine from these flags in which direction or directions, if any, data is to be transferred using the truth table 5 stored in memory 3:

TABLE

| F0 | F1 | F2 | F3 | Action |
|----|----|----|----|--------|
| 0 | 0 | 0 | 0 | No Transfer |
| 0 | 0 | 0 | 1 | No Transfer |
| 0 | 0 | 1 | 0 | No Transfer |
| 0 | 0 | 1 | 1 | No Transfer |
| 0 | 1 | 0 | 0 | No Transfer |
| 0 | 1 | 0 | 1 | No Transfer |
| 0 | 1 | 1 | 0 | Master → Slave |
| 0 | 1 | 1 | 1 | Master → Slave |
| 1 | 0 | 0 | 0 | No Transfer |
| 1 | 0 | 0 | 1 | Slave → Master |
| 1 | 0 | 1 | 0 | No Transfer |
| 1 | 0 | 1 | 1 | Slave → Master |
| 1 | 1 | 0 | 0 | No Transfer |
| 1 | 1 | 0 | 1 | Slave → Master |
| 1 | 1 | 1 | 0 | Master → Slave |
| 1 | 1 | 1 | 1 | Slave → Master & Master → Slave |

If the status table gives a "No Transfer" result, then communication is stopped any bytes that may have been sent are ignored.

Assuming transfer is to continue in both directions, the next byte of the request and status number packets 20, 30 are transmitted. This is a length byte 34,24 giving the number of the respective message packet. Next, payload bytes 36, 26 are transmitted in each direction down the duplex link.

In one of the message packet lengths is greater than the other message packet length then the padding bytes are sent at the end of the shorter message packet. These padding bytes are then ignored on receipt.

If transfer is to be completed in only one of the two directions, then the transfer continues for the length of the respective length byte. The bytes transferred in the opposite direction may be padding bytes or any other bytes; these bytes will be ignored on receipt.

In this way the efficiency of data transfer is maximized. The system can easily cope with applications where the flow of message packets-in each direction is unpredictable or unrelated.

The payload bytes may include one or more bytes giving further setup information, as well as data bytes. Each message accordingly represents a packet of data.

The simplicity of implementation and the corresponding low data overhead makes the approach ideal for low cost high speed application.

Figure 3:
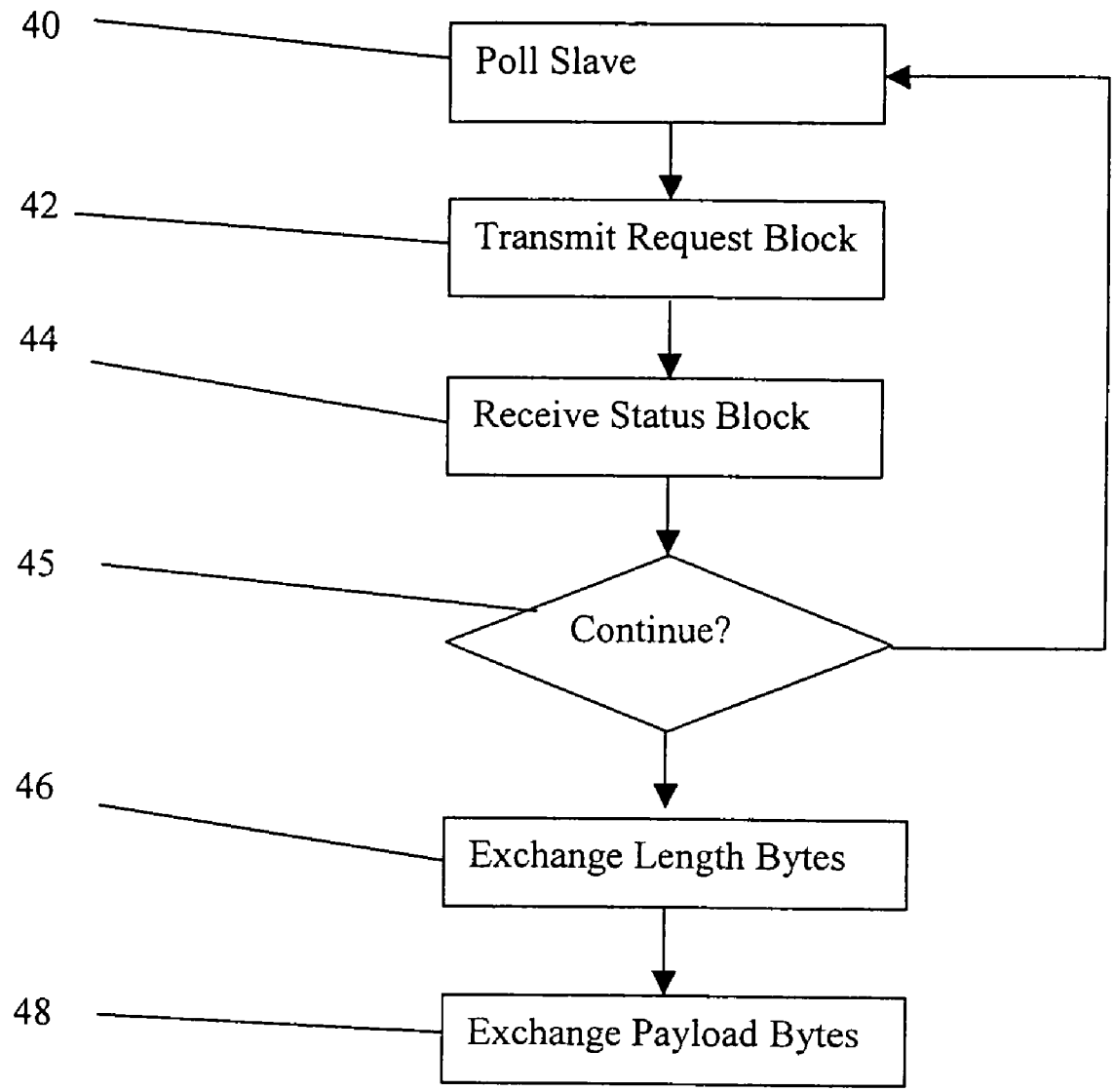
FIG. 3 is a flow diagram of the operation of the master device.

The operation of the master device alone is set out in the flow diagram of FIG. 3. First, the master device polls 40 a slave device, and transmits 42 the request byte. On receipt of the status byte 44, the master device consults the table (Table 1) to determine if transmission is to continue. If so, length bytes are exchanged 46 and then a number of message bytes exchanged 48. If the table determines that only one message packet is to be transmitted, the number of message bytes is the length of that message. If both message packets are to be transmitted, then the number of message bytes is the length of the longer of the two messages.

The master device controls the clock on the basis of the length of the message packet determined.

Figure 4:
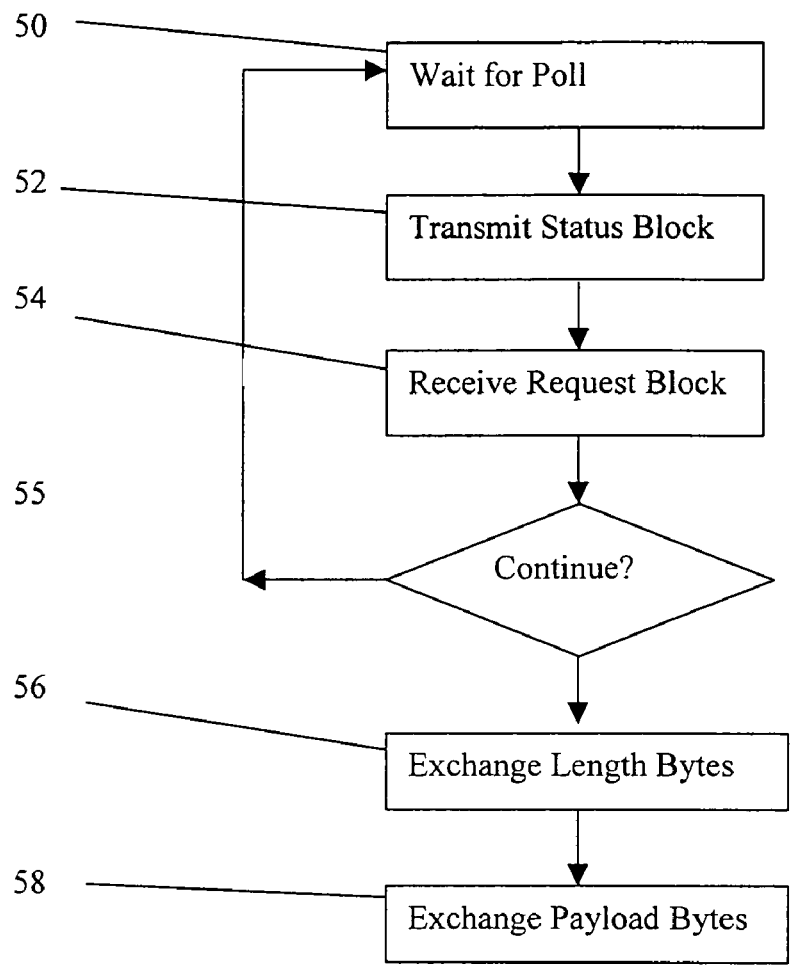
FIG. 4 is a flow diagram of the operation of the slave device.

The slave device operates in a like manner as set out in FIG. 4.

First, the slave device receives 50 the poll signal from the master device, and transmits 52 the status block. On receipt 54 of the request block, the slave device consults the table (Table 1) to determine if transmission is to continue. Note that both master and slave independently determine using the same data if the message packet transmission is to continue. If so, length bytes are exchanged 56 and then a number of message bytes exchanged 58.

Padding bytes are added if necessary to the shorter message packet.

As will be appreciated by the skilled person the master device and the slave device may be adapted to operate this method using either hardware or software implementations.

Figure 5:
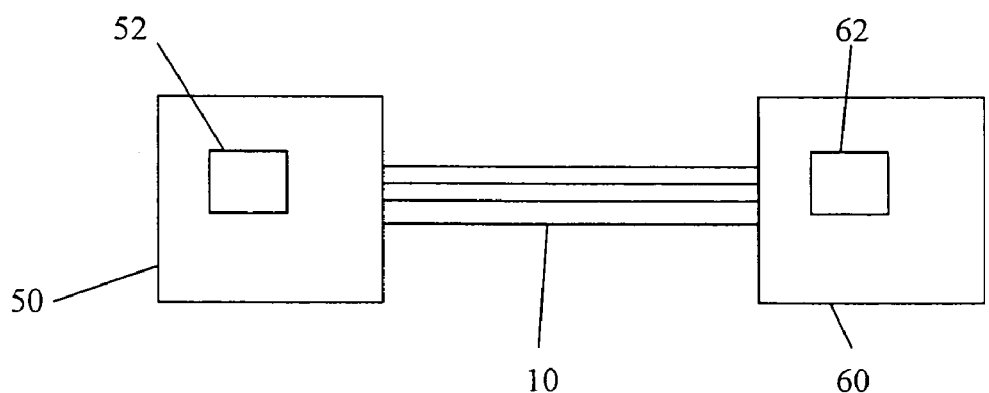
FIG. 5 is a schematic of a communications link.

In a specific example, referring to FIG. 5, the invention may be used to link the network layer 52 of a communications interface on a device acting as the master 50 and a medium access control (MAC) layer 62 on a second device acting as the slave 60, through a serial link 10. Both master and slave 50, 60 are hardware implementations forming part of separate, discrete integrated circuits.

The master 50 is unable to tell when the slave 60 has data. Accordingly, the master device 50 polls the slave periodically. In alternate embodiments, an interrupt could be used, but this is not necessary.

On exchange of the-status and request bits, both devices determine whether data is to be exchanged, and if so exchange length bits. Payload data is then exchanged. The payload data may include a MAC layer primitive defining the MAC data format.

The invention is particularly suitable for communications stacks implemented in multichip solutions. The invention may be used for interchip communication.

The skilled person will appreciate that the above description relates purely to an example of the invention and that many alternative approaches may be used. Any suitable feature of other byte-oriented synchronous serial duplex systems may be incorporated in place of the features of the embodiment above.

Although the above description relates to a byte-oriented synchronous serial duplex system the invention may be implemented in systems in which the data is transmitted in bits, or words of any length. The term "word" is used in this specification to describe such units of data transfer, and is intended to include words of length 8 bits, also known as bytes, as well as any other suitable length. The invention may be implemented in any packet oriented synchronous serial duplex system.

The invention is also applicable to half-duplex systems. For example, the underlying transport layer may transmit data by first transmitting a bit from master to slave, then from slave to master, and alternating bits transmitted in each direction until messages are transmitted in both directions.

In some implementations it may be possible to transmit varying numbers of bits and in such implementations the first two flag bits in each message packet may be transmitted as individual bits before transmitting the length and payload words.

The invention claimed is:

1. A communication method in a two-way synchronous packet serial communications link between a master device and slave device, the method including: sending a first message packet from master to slave, the first message packet including at its start a request block including a master receive data enable field indicating whether the master layer is ready to receive data and a master transmit data request field indicating whether the master layer ready to send data; sending a second message packet from the slave to the master, the second message packet including at its start a status block including a slave receive data enable field indicating whether the slave layer is ready to receive data and a slave transmit data request field indicating whether the slave layer ready to send data; transmitting the rest of the first message packet if the master transmit data request field indicates that the master layer is ready to send data and the slave receive data field indicates that the slave layer is ready to receive data; transmitting the rest of the second message packet if the slave transmit data request field indicates that the slave layer is ready to send data and the master receive data field indicates that the master is ready to receive data.

2. A communication method according to claim 1 further including: aborting transmission if the status and request words indicate that neither the first message packet nor the second message packet are to be continued.

3. A method according to claim 1 wherein the first two bits to be transmitted in the status block are a pair of single bits being the master receive data enable field and the master transmit data request field, and the first two bits in the request block are a pair of single bits being the slave receive data enable field and the slave transmit data request field.

4. A method according to claim 1 wherein the first and second message packets include a length word after the request or status block indicating the length of the message packet.

5. A method according to claim 1 wherein each message packet is divided in to words of a predetermined length, the request or status block forming the first word.

6. A method according to claim 1 wherein the data transmission occurs using an SPI protocol across a link with just four lines functioning as a clock line, a chip select line, a data in line and a data out line.

7. A method according to claim 1 wherein the master device implements a network layer and the slave device implements a medium access control layer, the master and slave devices being implemented as separate integrated circuits.

8. A method of operating a master device in a two-way synchronous serial communications link between a master device and a slave device, the method including: sending a first message packet to the slave, the first message packet including at its start a request block including a master receive data enable field indicating whether the master layer is ready to receive data and a master transmit data request field indicating whether the master layer ready to send data; receiving a second message packet from the slave, the second message packet including at its start a status block including a slave receive data enable field indicating whether the slave layer is ready to receive data and a slave transmit data request field indicating whether the slave layer ready to send data; transmitting the rest of the first message packet if the master transmit data request field indicates that the master layer is ready to send data and the slave receive data field indicates that the slave layer is ready to receive data; and receiving the rest of the second message packet if the slave transmit data request field indicates that the slave layer is ready to send data and the master receive data field indicates that the master is ready to receive data.

9. A method of operating a slave device in a two-way synchronous serial communications link between a master layer in the slave device and a slave layer in the slave device, the method including: receiving a first message packet from the master, the first message packet including at its start a request block including a master receive data enable field indicating whether the master layer is ready to receive data and a master transmit data request field indicating whether the master layer ready to send data; transmitting a second message packet to the master, the second message packet including at its start a status block including a slave receive data enable field indicating whether the slave layer is ready to receive data and a slave transmit data request field indicating whether the slave layer ready to send data; receiving the rest of the first message packet if the master transmit data request field indicates that the master layer is ready to send data and the slave receive data field indicates that the slave layer is ready to receive data; and transmitting the rest of the second message packet if the slave transmit data request field indicates that the slave layer is ready to send data and the master receive data field indicates that the master is ready to receive data.

10. A computer readable medium encoded with a computer program arranged to cause a master device in a two-way synchronous serial communications link between the master device and a slave device to carry out the steps of: sending a first message packet to the slave, the first message packet including at its start a request block including a master receive data enable field indicating whether the master layer is ready to receive data and a master transmit data request field indicating whether the master layer ready to send data; receiving a second message packet from the slave, the second message packet including at its start a status block including a slave receive data enable field indicating whether the slave layer is ready to receive data and a slave transmit data request field indicating whether the slave layer ready to send data; transmitting the rest of the first message packet if the master transmit data request field indicates that the master layer is ready to send data and the slave receive data field indicates that the slave layer is ready to receive data; and receiving the rest of the second message packet if the slave transmit data request field indicates that the slave layer is ready to send data and the master receive data field indicates that the master is ready to receive data.

11. A computer readable medium encoded with a computer program product arranged to cause a slave device in a two-way synchronous serial communications link between a master device and the slave device to carry out the steps of: receiving a first message packet from the master, the first message packet including at its start a request block including a master receive data enable field indicating whether the master layer is ready to receive data and a master transmit data request field indicating whether the master layer ready to send data; transmitting a second message packet to the master, the second message packet including at its start a status block including a slave receive data enable field indicating whether the slave layer is ready to receive data and a slave transmit data request field indicating whether the slave layer ready to send data; receiving the rest of the first message packet if the master transmit data request field indicates that the master layer is ready to send data and the slave receive data field indicates that the slave layer is ready to receive data; and transmitting the rest of the second message packet if the slave transmit data request field indicates that the slave layer is ready to send data and the master receive data field indicates that the master is ready to receive data.

12. A master device, comprising: a duplex or half duplex synchronous serial interface for communicating with a slave device using a two-way packet-oriented synchronous serial communications link; and a controller arranged to cause the master device: to send a first message packet to the slave device through the serial interface, the first message packet including at its start a request word including a master receive data enable field indicating whether the master layer is ready to receive data and a master transmit data request field indicating whether the master layer ready to send data; to receive a second message packet from the slave device through the serial interface, the second message packet including at its start a status word including a slave receive data enable field indicating whether the slave layer is ready to receive data and a slave transmit data request field indicating whether the slave layer ready to send data; to transmit the rest of the first message packet through the serial interface if the master transmit data request field indicates that the master layer is ready to send data and the slave receive data field indicates that the slave layer is ready to receive data; and to transmit the rest of the second message packet if the slave transmit data request field indicates that the slave layer is ready to send data and the master receive data field indicates that the master is ready to receive data.

13. A slave device, comprising: a duplex or half duplex synchronous serial interface for communicating with a master device using a two-way packet-oriented synchronous serial communications link; wherein the slave device is arranged: to receive a first message packet from the master device through the serial interface, the first message packet including at its start a request word including a master receive data enable field indicating whether the master is ready to receive data and a master transmit data request field indicating whether the master is ready to send data; to synchronously send a second message packet to the master device through the serial interface, the second message packet including at its start a status word including a slave receive data enable field indicating whether the slave layer is ready to receive data and a slave transmit data request field indicating whether the slave layer is ready to send data; to continue to receive the first message packet through the serial interface if the master transmit data request field indicates that the master is ready to send data and the slave receive data field indicates that the slave layer is ready to receive data; and to continue to transmit the second message packet if the slave transmit data request field indicates that the slave layer is ready to send data and the master receive data field indicates that the master is ready to receive data.

14. A synchronous communications system including a master device comprising: a duplex or half duplex synchronous serial interface for communicating with a slave device using a two-way packet-oriented synchronous serial communications link; and a controller arranged to cause the master device: to send a first message packet to the slave device through the serial interface, the first message packet including at its start a request word including a master receive data enable field indicating whether the master layer is ready to receive data and a master transmit data request field indicating whether the master layer ready to send data; to receive a second message packet from the slave device through the serial interface, the second message packet including at its start a status word including a slave receive data enable field indicating whether the slave layer is ready to receive data and a slave transmit data request field indicating whether the slave layer ready to send data; to transmit the rest of the first message packet through the serial interface if the master transmit data request field indicates that the master layer is ready to send data and the slave receive data field indicates that the slave layer is ready to receive data; and to transmit the rest of the second message packet if the slave transmit data request field indicates that the slave layer is ready to send data and the master receive data field indicates that the master is ready to receive data; and a slave device comprising: a duplex or half duplex synchronous serial interface for communicating with a master device using a two-way packet-oriented synchronous serial communications link; wherein the slave device is arranged: to receive a first message packet from the master device through the serial interface, the first message packet including at its start a request word including a master receive data enable field indicating whether the master is ready to receive data and a master transmit data request field indicating whether the master is ready to send data; to synchronously send a second message packet to the master device through the serial interface, the second message packet including at its start a status word including a slave receive data enable field indicating whether the slave layer is ready to receive data and a slave transmit data request field indicating whether the slave layer is ready to send data; to continue to receive the first message packet through the serial interface if the master transmit data request field indicates that the master is ready to send data and the slave receive data field indicates that the slave layer is ready to receive data; and to continue to transmit the second message packet if the slave transmit data request field indicates that the slave layer is ready to send data and the master receive data field indicates that the master is ready to receive data.

15. A synchronous communications system, comprising: a master device having a serial interface; a slave device having a serial interface; a synchronous serial communications link between the serial interfaces in the master and slave devices; wherein the synchronous communications system is arranged: to send a first message packet from master to slave, the first message packet including at its start a request word including a master receive data enable field indicating whether the master layer is ready to receive data and a master transmit data request field indicating whether the master layer ready to send data; to send a second message packet from the slave to the master, the second message packet including at its start a status word including a slave receive data enable field indicating whether the slave layer is ready to receive data and a slave transmit data request field indicating whether the slave layer ready to send data; to continue to transmit the first message packet if the master transmit data request field indicates that the master layer is ready to send data and the slave receive data field indicates that the slave layer is ready to receive data; and to continue to transmit the second message packet if the slave transmit data request field indicates that the slave layer is ready to send data and the master receive data field indicates that the master is ready to receive data.

16. A system according to claim 15 wherein the serial communications link has four data lines, functioning as a clock line, a chip select line, a data out line for transmitting data to the master and a data in fine for transmitting data to the slave.

* * * * *